(12) United States Patent
Greene

(10) Patent No.: US 11,356,563 B1
(45) Date of Patent: Jun. 7, 2022

(54) AMPLIFIED CABLE MODEM

(71) Applicant: Andre Greene, Bronx, NY (US)

(72) Inventor: Andre Greene, Bronx, NY (US)

( * ) Notice: Subject to any disclaimer, the term of this patent is extended or adjusted under 35 U.S.C. 154(b) by 84 days.

(21) Appl. No.: 16/902,384

(22) Filed: Jun. 16, 2020

(51) Int. Cl.
*H04M 7/00* (2006.01)
*H04B 1/38* (2015.01)

(52) U.S. Cl.
CPC ............ *H04M 7/0024* (2013.01); *H04B 1/38* (2013.01)

(58) Field of Classification Search
CPC ............................... H04M 7/0024; H04B 1/38
See application file for complete search history.

(56) References Cited

U.S. PATENT DOCUMENTS

| | | | |
|---|---|---|---|
| 6,681,100 B1 | 1/2004 | Ge | |
| 6,785,267 B1 * | 8/2004 | Knappe | H04L 12/6418 370/353 |
| 7,245,180 B2 | 7/2007 | Earl | |
| 8,375,415 B2 | 2/2013 | Waight | |
| 8,767,776 B2 * | 7/2014 | Bunn | H04L 69/04 370/474 |
| D794,020 S | 8/2017 | Hornza | |
| 9,735,814 B1 | 8/2017 | Jin | |
| 2003/0035471 A1 * | 2/2003 | Pitsoulakis | H04L 12/4633 375/222 |
| 2005/0249245 A1 * | 11/2005 | Hazani | H04L 5/06 370/485 |
| 2010/0266000 A1 * | 10/2010 | Froimovich | H04N 21/6168 375/222 |
| 2018/0124716 A1 | 5/2018 | Krishnan | |

FOREIGN PATENT DOCUMENTS

WO 2005008960 1/2005

* cited by examiner

*Primary Examiner* — Dac V Ha
(74) *Attorney, Agent, or Firm* — Kyle A. Fletcher, Esq.

(57) ABSTRACT

The amplified cable modem includes a master circuit, a data network circuit, a telephony circuit, and a housing. The master circuit, a data network circuit, a telephony circuit are electrically interconnected. The housing contains the master circuit, the data network circuit, and the telephony circuit. The master circuit: a) receives the input signal; b) splits the input signal into the data network signal and the telephony signal; c) recombines signals from the data network circuit and the telephony circuit into the output signal; and, d) transmits the output signal to the external data source. The amplified cable modem includes a collection of amplifiers configured to maximize transmission power while generating minimal electrical noise in the amplified signals.

19 Claims, 5 Drawing Sheets

AMPLIFIED CABLE MODEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electric communication technique including details of transceivers, more specifically, transceiver circuits with a means for limiting noise, interference, and distortion. (H04B1/0475)

SUMMARY OF INVENTION

The amplified cable modem is an electric circuit. The amplified cable modem: a) receives an input signal from an external data source; b) splits the input signal into a data network signal and a telephony signal; c) maintains a plurality of wireless communication links between the amplified cable modem and one or more data devices; d) maintains a plurality of wireless communication links between the amplified cable modem and one or more telephony sets; and, e) transmits an output signal to the external data source. The amplified cable modem comprises a master circuit, a data network circuit, a telephony circuit, and a housing. The master circuit, a data network circuit, a telephony circuit are electrically interconnected. The housing contains the master circuit, the data network circuit, and the telephony circuit. The master circuit: a) receives the input signal; b) splits the input signal into the data network signal and the telephony signal; c) recombines signals from the data network circuit and the telephony circuit into the output signal; and, d) transmits the output signal to the external data source. The amplified cable modem comprises a collection of amplifiers configured to maximize transmission power while generating minimal electrical noise in the amplified signals.

These together with additional objects, features and advantages of the amplified cable modem will be readily apparent to those of ordinary skill in the art upon reading the following detailed description of the presently preferred, but nonetheless illustrative, embodiments when taken in conjunction with the accompanying drawings.

In this respect, before explaining the current embodiments of the amplified cable modem in detail, it is to be understood that the amplified cable modem is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the amplified cable modem.

It is therefore important that the claims be regarded as including such equivalent construction insofar as they do not depart from the spirit and scope of the amplified cable modem. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
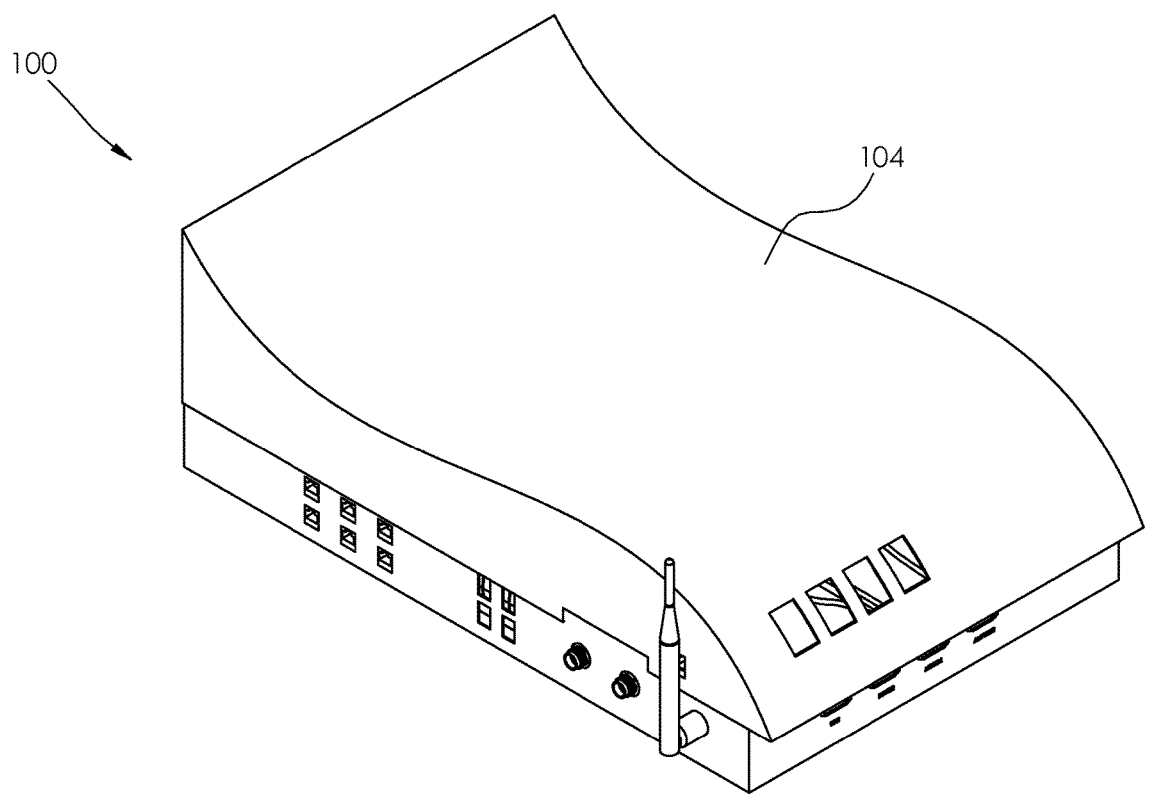
FIG. 1 is a perspective view of an embodiment of the disclosure.
Figure 2:
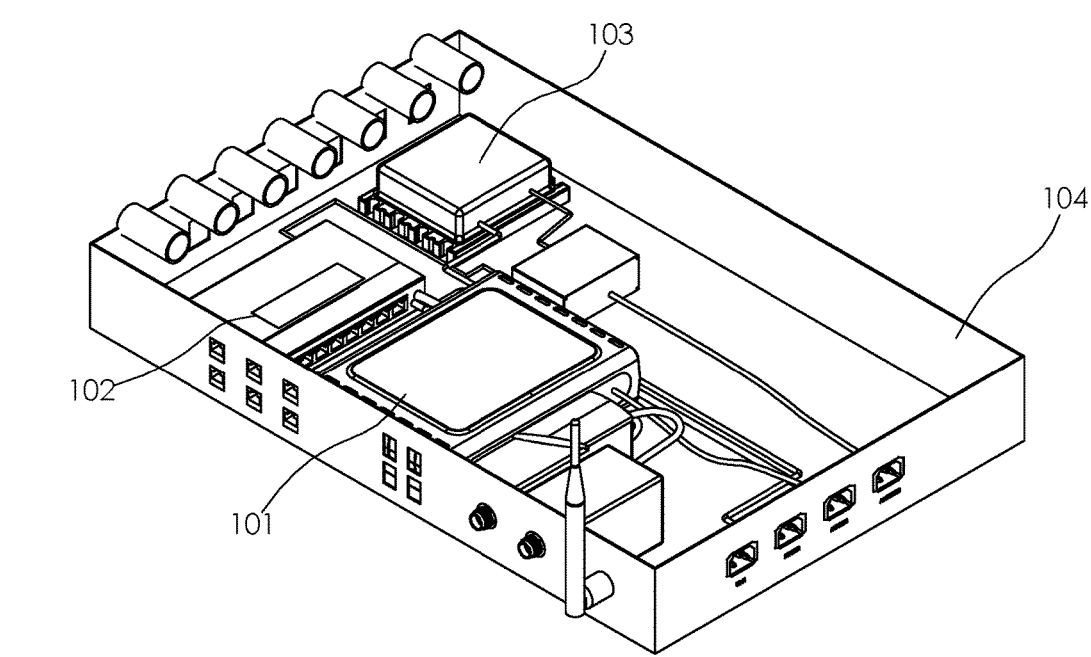
FIG. 2 is an exploded view of an embodiment of the disclosure.
Figure 3:
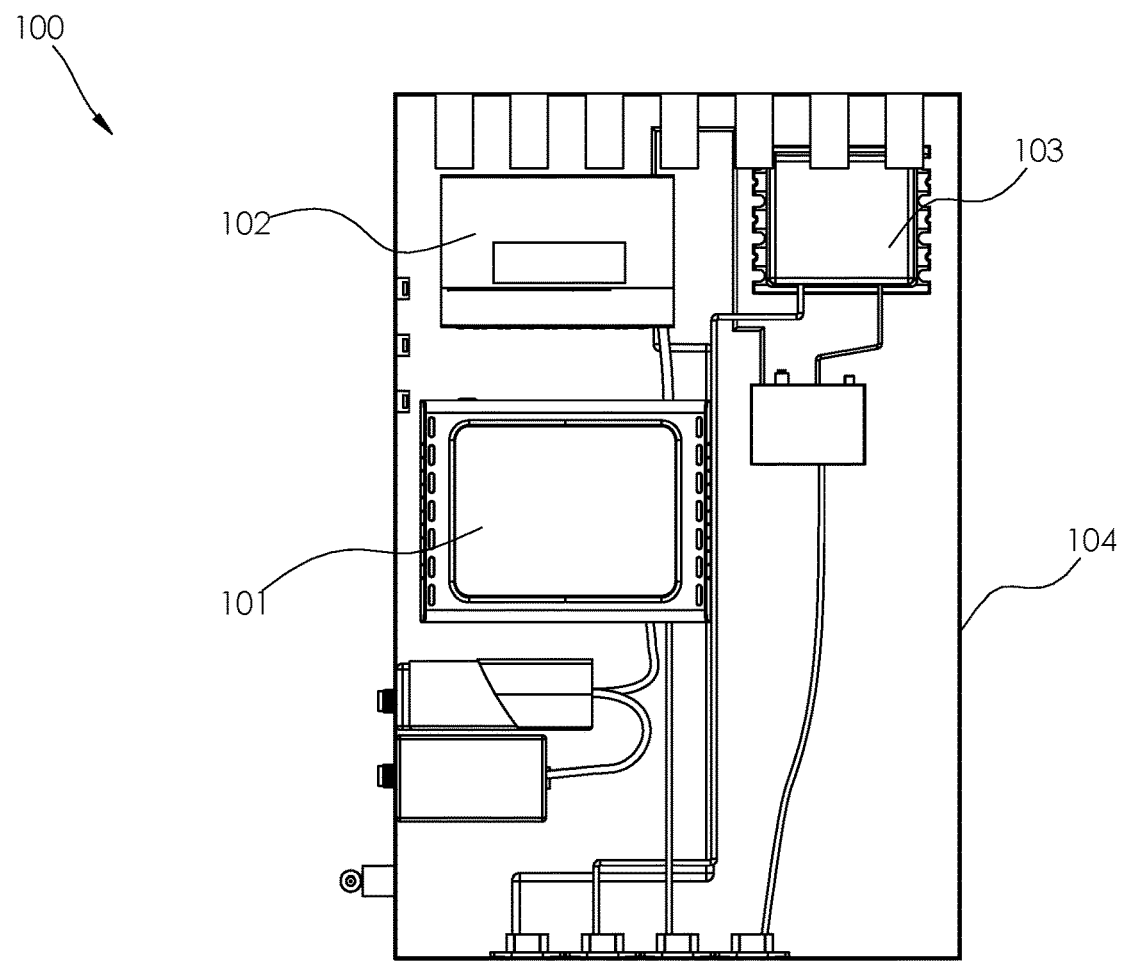
FIG. 3 is a top view of an embodiment of the disclosure.
Figure 4:
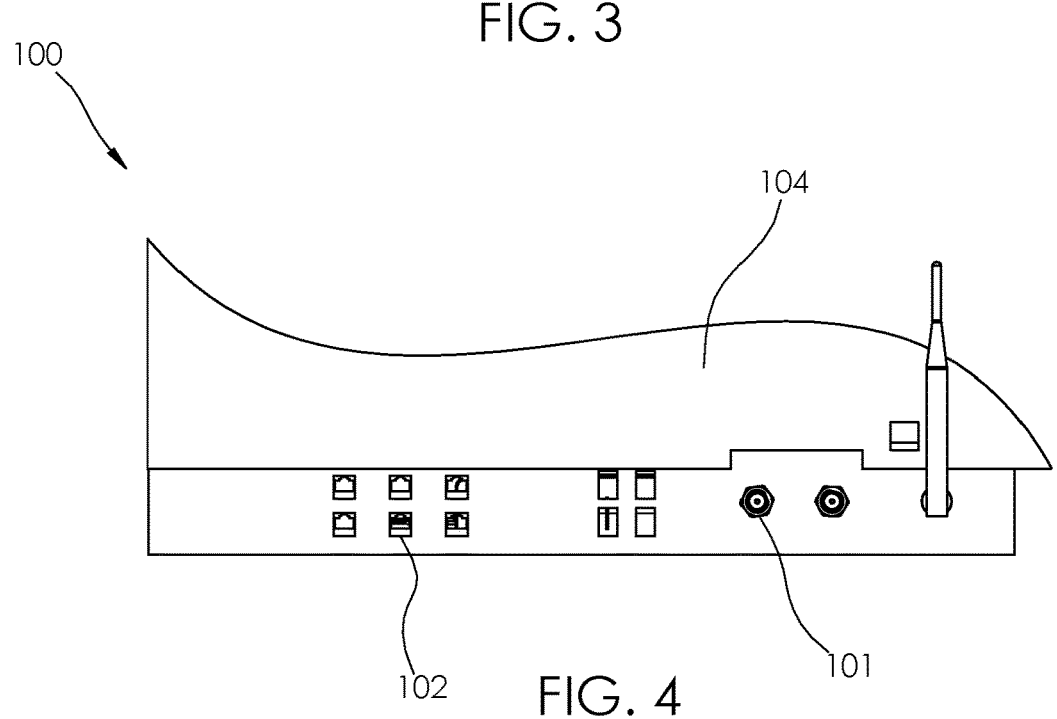
FIG. 4 is a side view of an embodiment of the disclosure.
Figure 5:
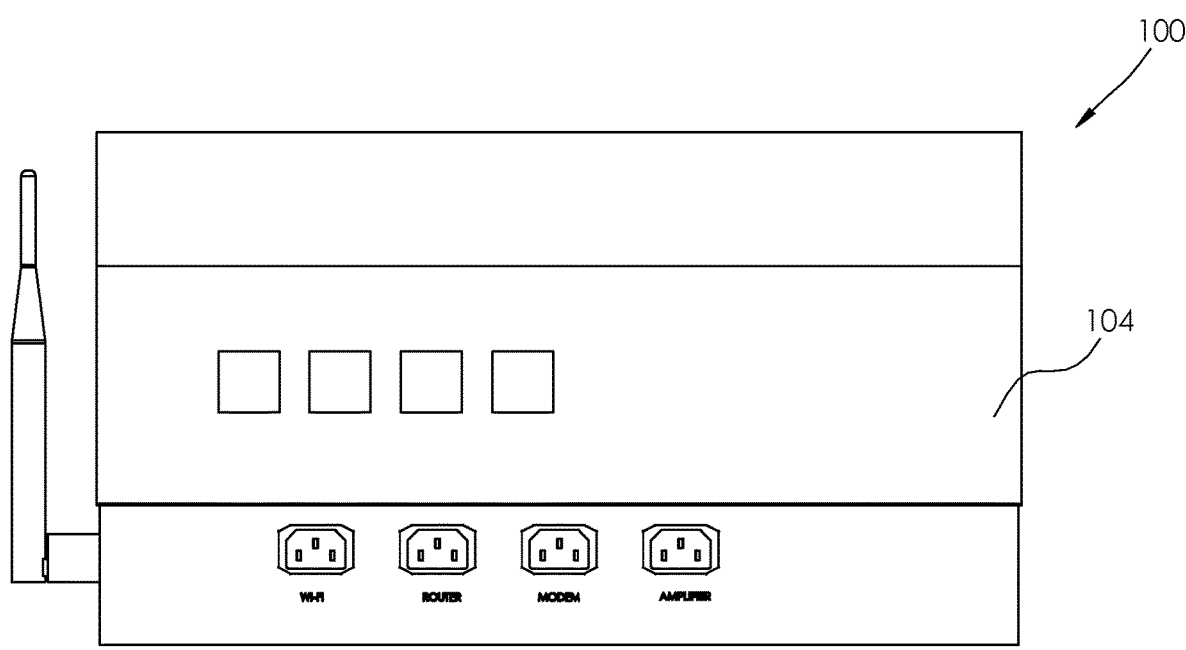
FIG. 5 is a front view of an embodiment of the disclosure.
Figure 6:
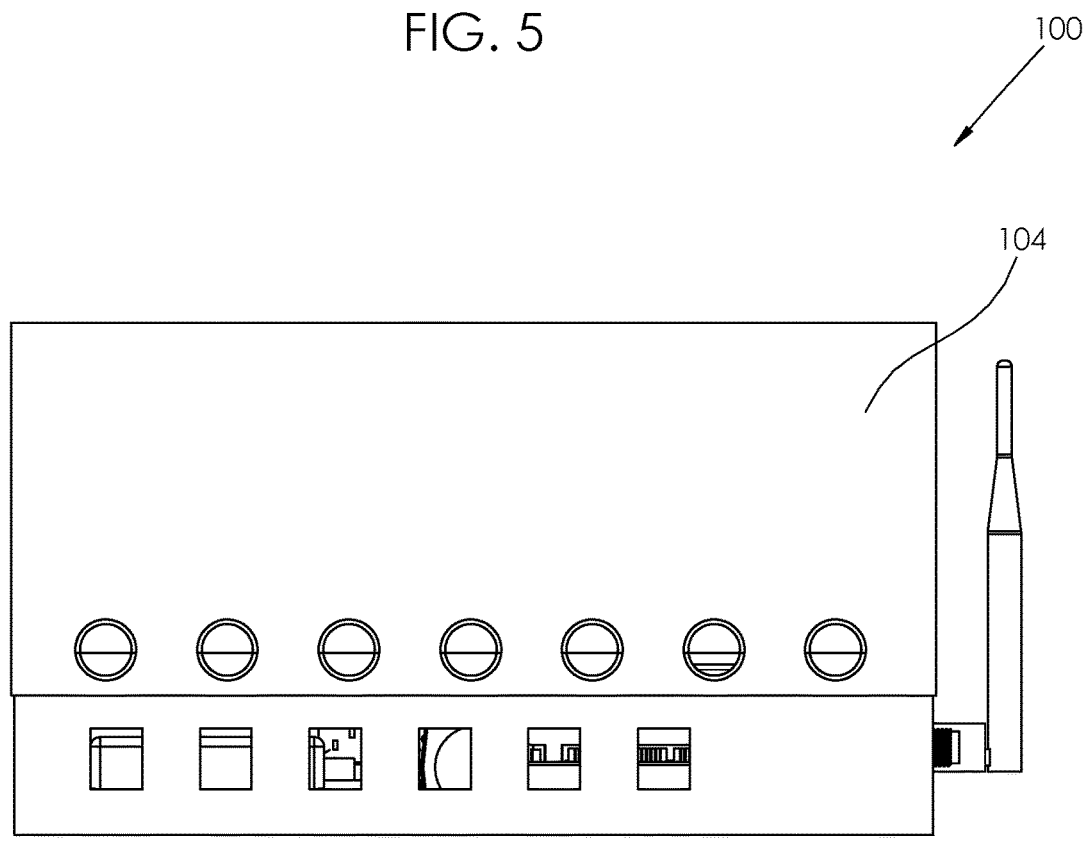
FIG. 6 is a rear view of an embodiment of the disclosure.
Figure 7:
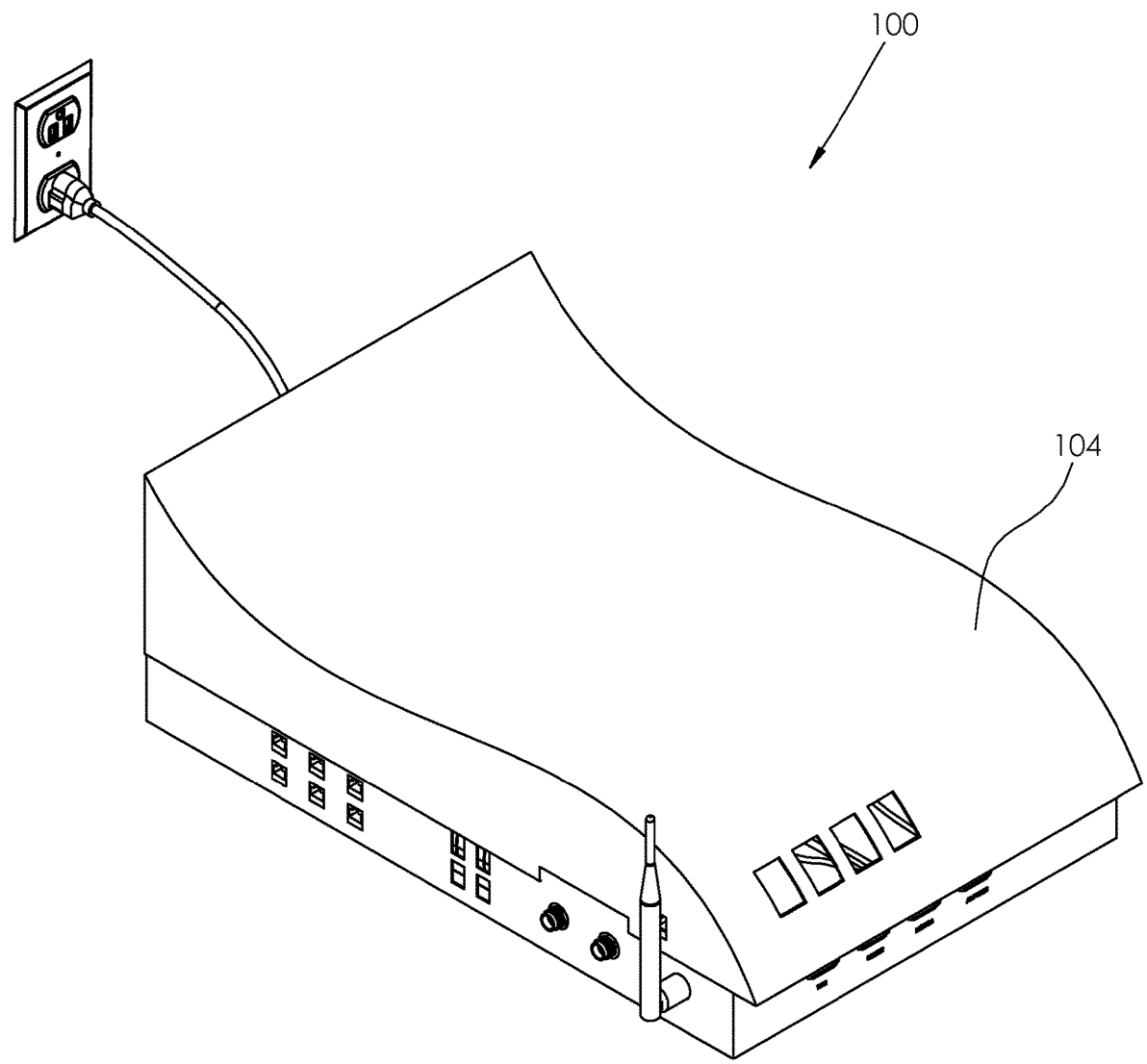
FIG. 7 is an in-use view of an embodiment of the disclosure.
Figure 8:
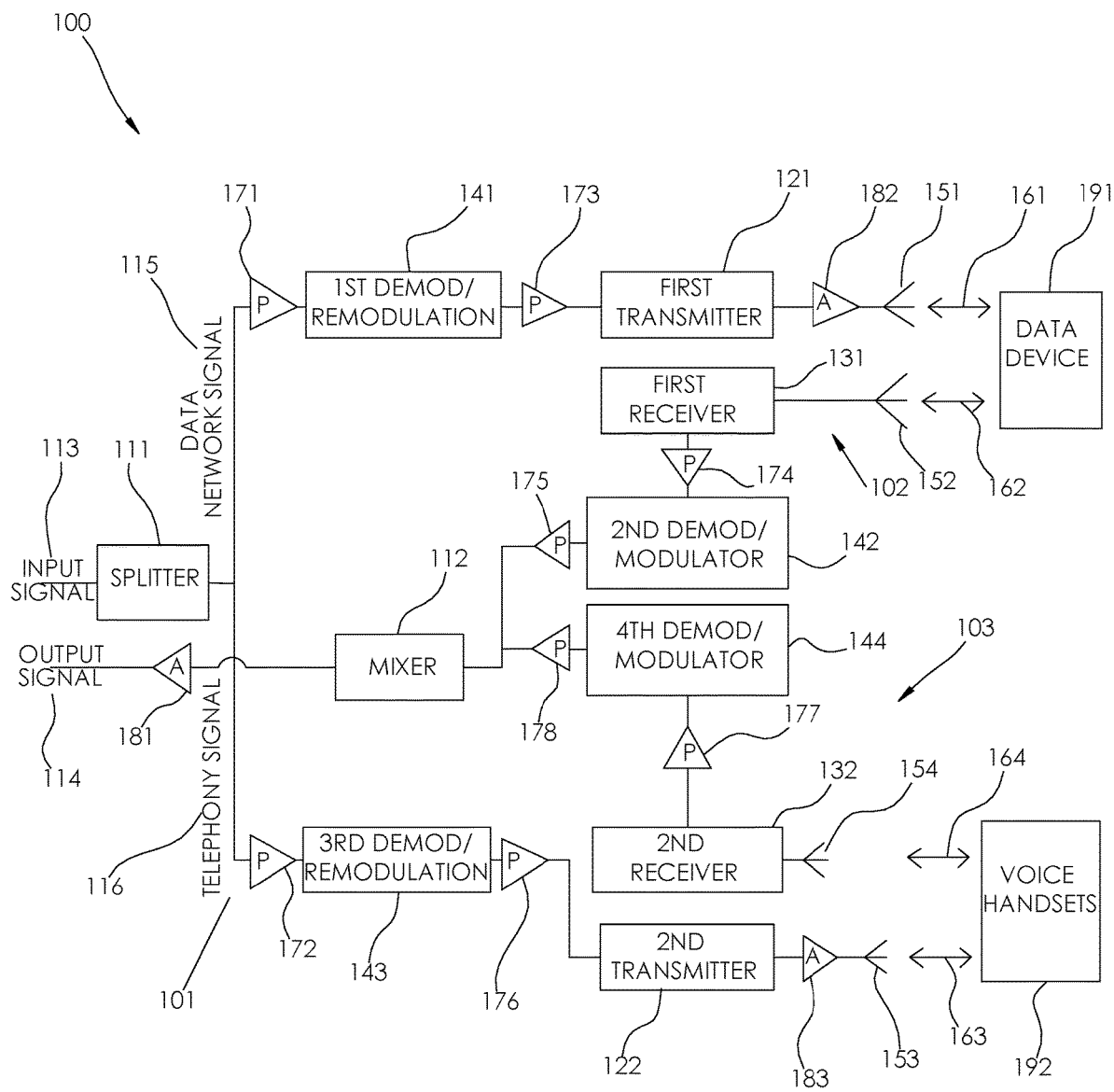
FIG. 8 is a schematic view of an embodiment of the disclosure.

Detailed reference will now be made to one or more potential embodiments of the disclosure, which are illustrated in FIGS. 1 through 8.

The amplified cable modem 100 (hereinafter invention) is an electric circuit. The invention 100: a) receives an input signal 113 from an external data source; b) splits the input signal 113 into a data network signal 115 and a telephony signal 116; c) maintains a plurality of wireless communication links between the invention 100 and one or more data devices 191; d) maintains a plurality of wireless communication links between the invention 100 and one or more telephony sets 192; and, e) transmits an output signal 114 to the external data source. The invention 100 comprises a master circuit 101, a data network circuit 102, a telephony circuit 103, and a housing 104. The master circuit 101, a data network circuit 102, a telephony circuit 103 are electrically interconnected. The housing 104 contains the master circuit 101, the data network circuit 102, and the telephony circuit 103. The master circuit 101: a) receives the input signal 113; b) splits the input signal 113 into the data network signal 115 and the telephony signal 116; c) recombines signals from the data network circuit 102 and the telephony circuit 103 into the output signal 114; and, d) transmits the output signal 114 to the external data source. The invention 100 comprises a collection of amplifiers configured to maximize transmission power while generating minimal electrical noise in the amplified signals.

Each of the one or more data devices 191 is a logical device configured for use in processing data. The one or more telephony sets 192 is a communication device dedicated for use in the exchange of voice data.

The housing 104 is a rigid structure. The housing 104 contains the master circuit 101, the data network circuit 102, and the telephony circuit 103. The housing 104 is formed with all apertures and form factors necessary to allow the housing 104 to accommodate the use, the operation, and the external connections of master circuit 101, the data network circuit 102, and the telephony circuit 103. Methods to form a housing 104 suitable for the purposes described in this disclosure are well-known and documented in the mechanical arts.

The master circuit 101 is an electric circuit. The master circuit 101 receives an electric signal from an external data source. The master circuit 101 splits the received electric signal into a data network signal 115 and a telephony signal 116. The master circuit 101 transmits the data network signal 115 to the data network circuit 102 for further processing. The master circuit 101 transmits the telephony signal 116 to the telephony circuit 103 for further processing. The master circuit 101 receives a first return electric signal from the data network circuit 102 and a second return electric signal from the telephony circuit 103. The master circuit 101 combines the first return electric signal and the second return electric signal to generate the output signal 114. The master circuit 101 transmits the output signal 114 to the external data source.

The master circuit 101 comprises a splitter 111, a mixer 112, an input signal 113, an output signal 114, a data network signal 115, a telephony signal 116, a first pre-amplifier 171, a second pre-amplifier 172, and a first power amplifier 181.

The splitter 111 is an electric circuit. The splitter 111 receives the input signal 113 from the external data source and splits the received input signal 113 into the data network signal 115 and the telephony signal 116. The splitter 111 transmits the data network signal 115 to the data network circuit 102. The splitter 111 transmits the telephony signal 116 to the telephony circuit 103.

The mixer 112 receives the first return electric signal from the data network circuit 102. The mixer 112 receives the second return electric signal from the telephony circuit 103. The mixer 112 combines the first return electric signal and the second return electric signal into the output signal 114. The mixer 112 transmits the output signal 114 to the external data source.

The input signal 113 is an electric signal that is generated by the external data source. The input signal 113 contains data that is reprocessed by the invention 100 and distributed to the data network signal 115 and the telephony signal 116. The output signal 114 is an electric signal that is transmitted to the external data source by the invention 100. The invention 100 combines data generated by the data network circuit 102 and the telephony circuit 103 into a single data stream that is encoded into the output signal 114.

The data network signal 115 is an electric signal that contains data received from the input signal 113 that is destined to be transmitted to the one or more data devices 191 for use. The telephony signal 116 is an electric signal that contains data received from the input signal 113 that is destined to be transmitted to the one or more telephony sets 192 for use.

The first pre-amplifier 171 is an amplifier that transfers an electric signal from the splitter 111 to the first demodulator/modulator 141. The first pre-amplifier 171: a) amplifies an electric signal generated by the splitter 111 and transmits the generated electric signal to the first demodulator/modulator 141 for processing; and, b) electrically buffers the splitter 111 from voltage spikes generated by the first demodulator/modulator 141. The first pre-amplifier 171 is a low gain amplifier that is configured for use in amplifying the data contained in a data signal without significantly increasing the noise in the electric signal.

The second pre-amplifier 172 is an amplifier that transfers an electric signal from the splitter 111 to the third demodulator/modulator 143. The second pre-amplifier 172: a) amplifies an electric signal generated by the splitter 111 and transmits the generated electric signal to the third demodulator/modulator 143 for processing; and, b) electrically buffers the splitter 111 from voltage spikes generated by the third demodulator/modulator 143. The second pre-amplifier 172 is a low gain amplifier that is configured for use in amplifying the data contained in a data signal without significantly increasing the noise in the electric signal.

The first power amplifier 181 is an amplifier that transfers an electric signal from the mixer 112 to the external data source. The first power amplifier 181: a) amplifies an electric signal generated by the mixer 112 and processing the generated electric signal to the external data source for transmission and, b) electrically buffers the mixer 112 from voltage spikes generated by the external data source. The first power amplifier 181 is a high gain amplifier that is configured for use in amplifying the power of an electric signal containing data.

The data network circuit 102 is an electric circuit. The data network circuit 102 receives the data network signal 115 from the master circuit 101. The data network circuit 102 processes and retransmits the received data network signal 115 to the one or more data devices 191. The data network circuit 102 receives responding transmissions from the one or more data devices 191 and processes the received responding transmissions into the first return electric signal. The data network circuit 102 transmits the first return electric signal to the master circuit 101 for further processing.

The data network circuit 102 comprises a first transmitter 121, a first receiver 131, a first demodulator/modulator 141, a second demodulator/modulator 142, a first antenna 151, a second antenna 152, a first wireless communication link 161, a second wireless communication link 162, a third pre-amplifier 173, fourth pre-amplifier 174, a fifth pre-amplifier 175, and a second power amplifier 182. The first transmitter 121, the first receiver 131, the first demodulator/modulator 141, the second demodulator/modulator 142, the first antenna 151, the second antenna 152, the third pre-amplifier 173, the fourth pre-amplifier 174, the fifth pre-amplifier 175, and the second power amplifier 182 are electrically interconnected.

The first transmitter 121 is an electric circuit. The first transmitter 121 is a radio frequency device. The first transmitter 121 generates the first wireless communication link 161 between the first transmitter 121 and the one or more data devices 191. The first transmitter 121 transmits data to the one or more data devices 191 over the first wireless communication link 161.

The first receiver 131 is an electric circuit. The first receiver 131 is a radio frequency device. The first receiver 131 generates the second wireless communication link 162 between the first receiver 131 and the one or more data devices 191. The first receiver 131 receives data from the one or more data devices 191 over the second wireless communication link 162.

The first demodulator/modulator 141 is an electric circuit. The first demodulator/modulator 141: a) receives the data network signal 115 from the splitter 111; b) demodulates the received signal; and, c) remodulates the received signal into a format usable by the first transmitter 121; and, d) transmits the remodulated signal to the first transmitter 121.

The second demodulator/modulator 142 is an electric circuit. The second demodulator/modulator 142: a) receives the first receiver 131; b) demodulates the received signal; and, c) remodulates the received signal into a format usable by the mixer 112; and, d) transmits the remodulated signal to the mixer 112.

The first antenna 151 is an electrical transducer that converts electric energy into electromagnetic radiation. The first antenna 151 transmits electric signals generated by the first transmitter 121 to the one or more data devices 191. The second antenna 152 is an electrical transducer that converts electric energy into electromagnetic radiation. The second antenna 152 receives electromagnetic radiation from the one or more data devices 191 and converts the received electromagnetic radiation into electrical signals that are transmitted to the first receiver 131.

The first wireless communication link 161 is a wireless communication link that transfers data from the first transmitter 121 to the one or more data devices 191. The second wireless communication link 162 is a wireless communication link that transfers data from the one or more data devices 191 to the first receiver 131.

The third pre-amplifier 173 is an amplifier that transfers an electric signal from the first demodulator/modulator 141 to the first transmitter 121. The third pre-amplifier 173: a) amplifies an electric signal generated by the first demodulator/modulator 141 and transmits the generated electric signal to the first transmitter 121 for processing; and, b) electrically buffers the first demodulator/modulator 141 from voltage spikes generated by the first transmitter 121. The third pre-amplifier 173 is a low gain amplifier that is configured for use in amplifying the data contained in a data signal without significantly increasing the noise in the electric signal.

The fourth pre-amplifier 174 is an amplifier that transfers an electric signal from the first receiver 131 to the second demodulator/modulator 142. The fourth pre-amplifier 174: a) amplifies an electric signal generated by the first receiver 131 and transmits the generated electric signal to the second demodulator/modulator 142 for processing; and, b) electrically buffers the first receiver 131 from voltage spikes generated by the second demodulator/modulator 142. The fourth pre-amplifier 174 is a low gain amplifier that is configured for use in amplifying the data contained in a data signal without significantly increasing the noise in the electric signal.

The fifth pre-amplifier 175 is an amplifier that transfers an electric signal from the second demodulator/modulator 142 to the mixer 112. The fifth pre-amplifier 175: a) amplifies an electric signal generated by the second demodulator/modulator 142 and transmits the generated electric signal to the mixer 112 for processing; and, b) electrically buffers the second demodulator/modulator 142 from voltage spikes generated by the mixer 112. The fifth pre-amplifier 175 is a low gain amplifier that is configured for use in amplifying the data contained in a data signal without significantly increasing the noise in the electric signal.

The second power amplifier 182 is an amplifier that transfers an electric signal from the first transmitter 121 to the first antenna 151. The second power amplifier 182: a) amplifies an electric signal generated by the first transmitter 121 and transmits the generated electric signal to the first antenna 151 for transmission and, b) electrically buffers the first transmitter 121 from voltage spikes generated by the first antenna 151. The second power amplifier 182 is a high gain amplifier that is configured for use in amplifying the power of a signal containing data.

The telephony circuit 103 is an electric circuit. The telephony circuit 103 receives the telephony signal 116 from the master circuit 101. The telephony circuit 103 processes and retransmits the received telephony signal 116 to the one or more telephony sets 192. The telephony circuit 103 receives responding transmissions from the one or more telephony sets 192 and processes the received responding transmissions into the second return electric signal. The telephony circuit 103 transmits the second return electric signal to the master circuit 101 for further processing.

The telephony circuit 103 comprises a second transmitter 122, a second receiver 132, a third demodulator/modulator 143, a fourth demodulator/modulator 144, a third antenna 153, a fourth antenna 154, a third wireless communication link 163, a fourth wireless communication link 164, a sixth pre-amplifier 176, the seventh pre-amplifier 177, an eighth pre-amplifier 178, and a third power amplifier 183. The second transmitter 122, the second receiver 132, the third demodulator/modulator 143, the fourth demodulator/modulator 144, the third antenna 153, the fourth antenna 154, the sixth pre-amplifier 176, the seventh pre-amplifier 177, the eighth pre-amplifier 178, and the third power amplifier 183 are electrically interconnected.

The second transmitter 122 is an electric circuit. The second transmitter 122 is a radio frequency device. The second transmitter 122 generates the third wireless communication link 163 between the second transmitter 122 and the one or more telephony sets 192. The second transmitter 122 transmits data to the one or more telephony sets 192 over the third wireless communication link 163.

The second receiver 132 is an electric circuit. The second receiver 132 is a radio frequency device. The second receiver 132 generates the fourth wireless communication link 164 between the second receiver 132 and the one or more telephony sets 192. The second receiver 132 receives data from the one or more telephony sets 192 over the fourth wireless communication link 164.

The third demodulator/modulator 143 is an electric circuit. The third demodulator/modulator 143: a) receives the telephony signal 116 from the splitter 111; b) demodulates the received signal; and, c) remodulates the received signal into a format usable by the second transmitter 122; and, d) transmits the remodulated signal to the second transmitter 122.

The fourth demodulator/modulator 144 is an electric circuit. The fourth demodulator/modulator 144: a) receives the second receiver 132; b) demodulates the received signal; and, c) remodulates the received signal into a format usable by the mixer 112; and, d) transmits the remodulated signal to the mixer 112.

The third antenna 153 is an electrical transducer that converts electric energy into electromagnetic radiation. The third antenna 153 transmits electric signals generated by the second transmitter 122 to the one or more telephony sets 192. The fourth antenna 154 is an electrical transducer that converts electric energy into electromagnetic radiation. The fourth antenna 154 receives electromagnetic radiation from the one or more telephony sets 192 and converts the received electromagnetic radiation into electrical signals that are transmitted to the second receiver 132.

The third wireless communication link 163 is a wireless communication link that transfers data from the second transmitter 122 to the one or more telephony sets 192. The fourth wireless communication link 164 is a wireless communication link that transfers data from the one or more telephony sets 192 to the second receiver 132.

The sixth pre-amplifier 176 is an amplifier that transfers an electric signal from the third demodulator/modulator 143 to the second transmitter 122. The sixth pre-amplifier 176: a) amplifies an electric signal generated by the third demodulator/modulator 143 and transmits the generated electric signal to the second transmitter 122 for processing; and, b) electrically buffers the third demodulator/modulator 143 from voltage spikes generated by the second transmitter 122. The sixth pre-amplifier 176 is a low gain amplifier that is configured for use in amplifying the data contained in a data signal without significantly increasing the noise in the electric signal.

The seventh pre-amplifier 177 is an amplifier that transfers an electric signal from the second receiver 132 to the fourth demodulator/modulator 144. The seventh pre-amplifier 177: a) amplifies an electric signal generated by the second receiver 132 and transmits the generated electric signal to the fourth demodulator/modulator 144 for processing; and, b) electrically buffers the second receiver 132 from voltage spikes generated by the fourth demodulator/modulator 144. The seventh pre-amplifier 177 is a low gain amplifier that is configured for use in amplifying the data contained in a data signal without significantly increasing the noise in the electric signal.

The eighth pre-amplifier 178 is an amplifier that transfers an electric signal from the fourth demodulator/modulator 144 to the mixer 112. The eighth pre-amplifier 178: a) amplifies an electric signal generated by the fourth demodulator/modulator 144 and transmits the generated electric signal to the mixer 112 for processing; and, b) electrically buffers the fourth demodulator/modulator 144 from voltage spikes generated by the mixer 112. The eighth pre-amplifier 178 is a low gain amplifier that is configured for use in amplifying the data contained in a data signal without significantly increasing the noise in the electric signal.

The third power amplifier 183 is an amplifier that transfers an electric signal from the second transmitter 122 to the third antenna 153. The third power amplifier 183: a) amplifies an electric signal generated by the second transmitter 122 and transmits the generated electric signal to the third antenna 153 for transmission and, b) electrically buffers the second transmitter 122 from voltage spikes generated by the third antenna 153. The third power amplifier 183 is a high gain amplifier that is configured for use in amplifying the power of a signal containing data.

The following definitions were used in this disclosure:

Amplifier: As used in this disclosure, an amplifier refers to an electronic component that increases voltage, current, or power of an input signal. Specifically, within this disclosure, an amplifier refers to a differential amplifier. A differential amplifier is a device with two inputs with a single output. A differential amplifier amplifies the voltage difference between the two inputs. The gain of an amplifier is defined as the ratio of the output to the input as measured in a set of units selected from the group consisting of electric voltage, electric current, and electric power. Electric voltage is the most commonly selected unit.

Antenna: As used in this disclosure, an antenna is an electrical apparatus used to: a) convert electrical current into electromagnetic radiation; and, b) convert electromagnetic radiation into electrical current. An antenna is a type of transducer.

Communication Link: As used in this disclosure, a communication link refers to the structured exchange of data between two objects.

Filter: As used in this disclosure, a filter refers to an electric circuit that: 1) receives an electrical signal as an input; and, based on the input signal, 2) generates an electrical signal as an output an electrical signal that comprises a selected subset of the frequencies that are contained in the input signal.

Form Factor: As used in this disclosure, the term form factor refers to the size and shape of an object.

Housing: As used in this disclosure, a housing is a rigid structure that encloses and protects one or more devices.

Receiver: As used in this disclosure, a receiver is an electric device that is used to receive and demodulate electromagnetic radiation such as radio signals.

Transceiver: As used in this disclosure, a transceiver is a device that is used to generate, transmit, and receive electromagnetic radiation such as radio signals.

Transducer: As used in this disclosure, a transducer is a device that converts a physical quantity, such as pressure or brightness into an electrical signal or a device that converts an electrical signal into a physical quantity.

Transmitter: As used in this disclosure, a transmitter is a device that is used to generate and transmit electromagnetic radiation such as radio signals.

Wireless: As used in this disclosure, wireless is an adjective that is used to describe a communication channel between two devices that does not require the use of physical cabling.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:
1. An amplified cable modem comprising
a master circuit, a data network circuit, a telephony circuit, and a housing;
wherein the housing contains the master circuit, the data network circuit, and the telephony circuit;
wherein the amplified cable modem receives an input signal from an external data source;

wherein the amplified cable modem splits the input signal into a data network signal and a telephony signal;
wherein the amplified cable modem maintains a plurality of wireless communication links between the amplified cable modem and one or more data devices;
wherein the amplified cable modem maintains a plurality of wireless communication links between the amplified cable modem and one or more telephony sets;
wherein the amplified cable modem transmits an output signal to the external data source;
wherein the master circuit, a data network circuit, a telephony circuit are electrically interconnected;
wherein the master circuit is an electric circuit;
wherein the master circuit receives an electric signal from the external data source;
wherein the amplified cable modem comprises a collection of amplifiers configured to maximize transmission power while generating minimal electrical noise in the amplified signals;
wherein the master circuit receives the input signal;
wherein the master circuit splits the input signal into the data network signal and the telephony signal;
wherein the master circuit recombines signals from the data network circuit and the telephony circuit into the output signal;
wherein the master circuit transmits the output signal to the external data source;
wherein the master circuit splits the received electric signal into a data network signal and a telephony signal;
wherein the master circuit transmits the data network signal to the data network circuit;
wherein the master circuit transmits the telephony signal to the telephony circuit;
wherein the master circuit receives a first return electric signal from the data network circuit and a second return electric signal from the telephony circuit;
wherein the master circuit combines the first return electric signal and the second return electric signal to generate the output signal;
wherein the master circuit transmits the output signal to the external data source.

2. The amplified cable modem according to claim 1
wherein the data network circuit is an electric circuit;
wherein the data network circuit receives the data network signal from the master circuit;
wherein the data network circuit processes and retransmits the received data network signal to the one or more data devices;
wherein the data network circuit receives responding transmissions from the one or more data devices and processes the received responding transmissions into the first return electric signal;
wherein the data network circuit transmits the first return electric signal to the master circuit.

3. The amplified cable modem according to claim 2
wherein the telephony circuit is an electric circuit;
wherein the telephony circuit receives the telephony signal from the master circuit;
wherein the telephony circuit processes and retransmits the received telephony signal to the one or more telephony sets;
wherein the telephony circuit receives responding transmissions from the one or more telephony sets and processes the received responding transmissions into the second return electric signal;
wherein the telephony circuit transmits the second return electric signal to the master circuit.

4. The amplified cable modem according to claim 3
wherein the master circuit comprises a splitter, a mixer, an input signal, an output signal, a data network signal, a telephony signal, a first pre-amplifier, a second pre-amplifier, and a first power amplifier;
wherein the splitter receives the input signal from the external data source and splits the received input signal into the data network signal and the telephony signal;
wherein the splitter transmits the data network signal to the data network circuit;
wherein the splitter transmits the telephony signal to the telephony circuit;
wherein the mixer receives the first return electric signal from the data network circuit;
wherein the mixer receives the second return electric signal from the telephony circuit;
wherein the mixer combines the first return electric signal and the second return electric signal into the output signal;
wherein the mixer transmits the output signal to the external data source.

5. The amplified cable modem according to claim 4
wherein the data network circuit comprises a first transmitter, a first receiver, a first demodulator/modulator, a second demodulator/modulator, a first antenna, a second antenna, a first wireless communication link, a second wireless communication link, a third pre-amplifier, fourth pre-amplifier, a fifth pre-amplifier, and a second power amplifier;
wherein the first transmitter, the first receiver, the first demodulator/modulator, the second demodulator/modulator, the first antenna, the second antenna, the third pre-amplifier, the fourth pre-amplifier, the fifth pre-amplifier, and the second power amplifier are electrically interconnected.

6. The amplified cable modem according to claim 5
wherein the telephony circuit comprises a second transmitter, a second receiver, a third demodulator/modulator, a fourth demodulator/modulator, a third antenna, a fourth antenna, a third wireless communication link, a fourth wireless communication link, a sixth pre-amplifier, the seventh pre-amplifier, an eighth pre-amplifier, and a third power amplifier;
wherein the second transmitter, the second receiver, the third demodulator/modulator, the fourth demodulator/modulator, the third antenna, the fourth antenna, the sixth pre-amplifier, the seventh pre-amplifier, the eighth pre-amplifier, and the third power amplifier are electrically interconnected.

7. The amplified cable modem according to claim 6
wherein the first pre-amplifier is an amplifier that transfers an electric signal from the splitter to the first demodulator/modulator;
wherein the first pre-amplifier: a) amplifies an electric signal generated by the splitter and transmits the generated electric signal to the first demodulator/modulator for processing; and, b) electrically buffers the splitter from voltage spikes generated by the first demodulator/modulator;
wherein the first pre-amplifier is a low gain amplifier;
wherein the second pre-amplifier is an amplifier that transfers an electric signal from the splitter to the third demodulator/modulator;
wherein the second pre-amplifier: a) amplifies an electric signal generated by the splitter and transmits the generated electric signal to the third demodulator/modulator for processing; and, b) electrically buffers the splitter from voltage spikes generated by the third demodulator/modulator;

wherein the second pre-amplifier is a low gain amplifier;

wherein the first power amplifier is an amplifier that transfers an electric signal from the mixer to the external data source;

wherein the first power amplifier: a) amplifies an electric signal generated by the mixer and processing the generated electric signal to the external data source for transmission and, b) electrically buffers the mixer from voltage spikes generated by the external data source;

wherein the first power amplifier is a high gain amplifier.

8. The amplified cable modem according to claim 7 wherein the first transmitter is an electric circuit;

wherein the first transmitter is a radio frequency device;

wherein the first transmitter generates the first wireless communication link between the first transmitter and the one or more data devices;

wherein the first transmitter transmits data to the one or more data devices over the first wireless communication link.

9. The amplified cable modem according to claim 8 wherein the first receiver is an electric circuit;

wherein the first receiver is a radio frequency device;

wherein the first receiver generates the second wireless communication link between the first receiver and the one or more data devices;

wherein the first receiver receives data from the one or more data devices over the second wireless communication link.

10. The amplified cable modem according to claim 9 wherein the first demodulator/modulator is an electric circuit;

wherein the first demodulator/modulator: a) receives the data network signal from the splitter; b) demodulates the received signal; and, c) remodulates the received signal into a format usable by the first transmitter; and, d) transmits the remodulated signal to the first transmitter;

wherein the second demodulator/modulator is an electric circuit;

wherein the second demodulator/modulator: a) receives the first receiver; b) demodulates the received signal; and, c) remodulates the received signal into a format usable by the mixer; and, d) transmits the remodulated signal to the mixer.

11. The amplified cable modem according to claim 10 wherein the first antenna is an electrical transducer that converts electric energy into electromagnetic radiation;

wherein the first antenna transmits electric signals generated by the first transmitter to the one or more data devices;

wherein the second antenna is an electrical transducer that converts electric energy into electromagnetic radiation;

wherein the second antenna receives electromagnetic radiation from the one or more data devices and converts the received electromagnetic radiation into electrical signals that are transmitted to the first receiver;

wherein the first wireless communication link is a wireless communication link that transfers data from the first transmitter to the one or more data devices;

wherein the second wireless communication link is a wireless communication link that transfers data from the one or more data devices to the first receiver.

12. The amplified cable modem according to claim 11 wherein the third pre-amplifier is an amplifier that transfers an electric signal from the first demodulator/modulator to the first transmitter;

wherein the third pre-amplifier: a) amplifies an electric signal generated by the first demodulator/modulator and transmits the generated electric signal to the first transmitter for processing; and, b) electrically buffers the first demodulator/modulator from voltage spikes generated by the first transmitter;

wherein the third pre-amplifier is a low gain amplifier;

wherein the fourth pre-amplifier is an amplifier that transfers an electric signal from the first receiver to the second demodulator/modulator;

wherein the fourth pre-amplifier: a) amplifies an electric signal generated by the first receiver and transmits the generated electric signal to the second demodulator/modulator for processing; and, b) electrically buffers the first receiver from voltage spikes generated by the second demodulator/modulator;

wherein the fourth pre-amplifier is a low gain amplifier;

wherein the fifth pre-amplifier is an amplifier that transfers an electric signal from the second demodulator/modulator to the mixer;

wherein the fifth pre-amplifier: a) amplifies an electric signal generated by the second demodulator/modulator and transmits the generated electric signal to the mixer for processing; and, b) electrically buffers the second demodulator/modulator from voltage spikes generated by the mixer;

wherein the fifth pre-amplifier is a low gain amplifier.

13. The amplified cable modem according to claim 12 wherein the second power amplifier is an amplifier that transfers an electric signal from the first transmitter to the first antenna;

wherein the second power amplifier: a) amplifies an electric signal generated by the first transmitter and transmits the generated electric signal to the first antenna for transmission and, b) electrically buffers the first transmitter from voltage spikes generated by the first antenna;

wherein the second power amplifier is a high gain amplifier.

14. The amplified cable modem according to claim 13 wherein the second transmitter is an electric circuit;

wherein the second transmitter is a radio frequency device;

wherein the second transmitter generates the third wireless communication link between the second transmitter and the one or more telephony sets;

wherein the second transmitter transmits data to the one or more telephony sets over the third wireless communication link.

15. The amplified cable modem according to claim 14 wherein the second receiver is an electric circuit;

wherein the second receiver is a radio frequency device;

wherein the second receiver generates the fourth wireless communication link between the second receiver and the one or more telephony sets;

wherein the second receiver receives data from the one or more telephony sets over the fourth wireless communication link.

16. The amplified cable modem according to claim 15 wherein the third demodulator/modulator is an electric circuit;

wherein the third demodulator/modulator: a) receives the telephony signal from the splitter; b) demodulates the received signal; and, c) remodulates the received signal into a format usable by the second transmitter; and, d) transmits the remodulated signal to the second transmitter;

wherein the fourth demodulator/modulator is an electric circuit;

wherein the fourth demodulator/modulator: a) receives the second receiver; b) demodulates the received signal; and, c) remodulates the received signal into a format usable by the mixer; and, d) transmits the remodulated signal to the mixer.

17. The amplified cable modem according to claim 16
wherein the third antenna is an electrical transducer that converts electric energy into electromagnetic radiation;
wherein the third antenna transmits electric signals generated by the second transmitter to the one or more telephony sets;
wherein the fourth antenna is an electrical transducer that converts electric energy into electromagnetic radiation;
wherein the fourth antenna receives electromagnetic radiation from the one or more telephony sets and converts the received electromagnetic radiation into electrical signals that are transmitted to the second receiver;
wherein the third wireless communication link is a wireless communication link that transfers data from the second transmitter to the one or more telephony sets;
wherein the fourth wireless communication link is a wireless communication link that transfers data from the one or more telephony sets to the second receiver.

18. The amplified cable modem according to claim 17
wherein the sixth pre-amplifier is an amplifier that transfers an electric signal from the third demodulator/modulator to the second transmitter;
wherein the sixth pre-amplifier: a) amplifies an electric signal generated by the third demodulator/modulator and transmits the generated electric signal to the second transmitter for processing; and, b) electrically buffers the third demodulator/modulator from voltage spikes generated by the second transmitter;
wherein the sixth pre-amplifier is a low gain amplifier;
wherein the seventh pre-amplifier: a) amplifies an electric signal generated by the second receiver and transmits the generated electric signal to the fourth demodulator/modulator for processing; and, b) electrically buffers the second receiver from voltage spikes generated by the fourth demodulator/modulator;
wherein the seventh pre-amplifier is a low gain amplifier;
wherein the eighth pre-amplifier is an amplifier that transfers an electric signal from the fourth demodulator/modulator to the mixer;
wherein the eighth pre-amplifier: a) amplifies an electric signal generated by the fourth demodulator/modulator and transmits the generated electric signal to the mixer for processing; and, b) electrically buffers the fourth demodulator/modulator from voltage spikes generated by the mixer;
wherein the eighth pre-amplifier is a low gain amplifier.

19. The amplified cable modem according to claim 18
wherein the third power amplifier is an amplifier that transfers an electric signal from the second transmitter to the third antenna;
wherein the third power amplifier: a) amplifies an electric signal generated by the second transmitter and transmits the generated electric signal to the third antenna for transmission and, b) electrically buffers the second transmitter from voltage spikes generated by the third antenna;
wherein the third power amplifier is a high gain amplifier.

* * * * *